US007916482B2

(12) United States Patent
Tomioka et al.

(10) Patent No.: US 7,916,482 B2
(45) Date of Patent: Mar. 29, 2011

(54) LOOP HEAT PIPE AND ELECTRONIC DEVICE

(75) Inventors: Kentaro Tomioka, Saitama (JP); Tomonao Takamatsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/495,341

(22) Filed: Jun. 30, 2009

(65) Prior Publication Data
US 2010/0149755 A1 Jun. 17, 2010

(30) Foreign Application Priority Data

Dec. 16, 2008 (JP) ................................. 2008-319942

(51) Int. Cl.
*H05K 7/20* (2006.01)
(52) U.S. Cl. .. 361/700; 361/699; 165/80.4; 165/104.26; 174/15.2; 257/715
(58) Field of Classification Search .................... None
See application file for complete search history.

(56) References Cited

U.S. PATENT DOCUMENTS

| 6,810,946 | B2 * | 11/2004 | Hoang | 165/104.26 |
| 7,352,581 | B2 * | 4/2008 | Tomioka | 361/702 |
| 7,461,688 | B2 * | 12/2008 | Huang et al. | 165/104.21 |
| 7,650,932 | B2 * | 1/2010 | Li | 165/104.33 |
| 7,654,310 | B2 * | 2/2010 | Li | 165/104.33 |
| 7,748,436 | B1 * | 7/2010 | Anderson et al. | 165/104.26 |
| 2007/0002538 | A1 | 1/2007 | Tomioka | |
| 2008/0078530 | A1 * | 4/2008 | Chang et al. | 165/104.26 |
| 2008/0128113 | A1 | 6/2008 | Tomioka | |

FOREIGN PATENT DOCUMENTS

| JP | 03-117891 | 5/1991 |
| JP | 06-088685 | 3/1994 |
| JP | 7-127982 | 5/1995 |
| JP | 2005-167224 | 6/2005 |
| JP | 2005-223124 | 8/2005 |
| JP | 2006-125783 | 5/2006 |
| JP | 2007-010249 | 1/2007 |
| JP | 2007-263427 | 10/2007 |
| JP | 2007-315740 | 12/2007 |
| WO | 2005/045333 | 5/2005 |

OTHER PUBLICATIONS

Japanese Patent Application No. 2008-319942 Notice of Rejection mailed Nov. 4, 2009 (English translation).

* cited by examiner

*Primary Examiner* — Boris L Chervinsky
(74) *Attorney, Agent, or Firm* — Blakely, Sokoloff, Taylor & Zafman LLP (57) ABSTRACT

According to one embodiment, a loop heat pipe including a fluid circulating channel containing fluid, includes: an evaporating portion configured to vaporize the fluid by heat from a heat generating component; a condensing portion configured to liquefy the vaporized fluid; a first fluid channel connecting the evaporating portion and the condensing portion, the vaporized fluid flowing through the first fluid channel; a second fluid channel connecting the evaporating portion and the condensing portion, the fluid liquefied by the condensing portion flowing through the second fluid channel; a liquid accumulating portion formed on an inner wall of the second fluid channel, and provided between the evaporating portion and the condensing portion, the liquid accumulating portion being configured to accumulate the liquid liquefied by the condensing portion; and a wick provided between the evaporating portion and a position where the liquid accumulating portion is formed.

9 Claims, 8 Drawing Sheets

FIG.12

LOOP HEAT PIPE AND ELECTRONIC DEVICE

CROSS-REFERENCE TO RELATED APPLICATIONS

This application is based upon and claims the benefit of priority from Japanese Patent Application No. 2008-319942, filed Dec. 16, 2008, the entire contents of which are incorporated herein by reference.

BACKGROUND

1. Field

One embodiment of the invention relates to a loop heat pipe that cools a heat generating component, and an electronic device provided therewith.

2. Description of the Related Art

A loop heat pipe is known as a heat carrier for cooling a heat generating component. The loop heat pipe includes an evaporating section that vaporizes working fluid by heat of a heat generating component; a condensing section that liquefies the working fluid vaporized by the evaporating section; a steam pipe that connects between the evaporating section and the condensing section, and through which the vaporized working fluid flows; and a liquid returning pipe that connects between the evaporating section and the condensing section, and through which the working fluid liquefied by the condensing section flows.

In the loop heat pipe operated in a top heat mode where the evaporating section is positioned higher than the condensing section, the working fluid is accumulated more in the condensing section due to gravity; therefore, making it difficult to supply the working fluid to the evaporating section. Accordingly, the working fluid cannot be circulated, thus the heat generating component cannot be cooled.

Japanese Patent Application Publication (KOKAI) No. 2006-125783 discloses a circulatory heat pipe having a liquid returning pipe provided with a wick that refluxes the condensed working fluid back to the evaporating section by capillary force of the wick. Such circulatory heat pipe is capable of supplying the working fluid to the evaporating section even when the circulatory heat pipe is operated in the top heat mode.

However, when the operation of the conventional circulatory heat pipe operated in the top heat mode is stopped and while the conventional circulatory heat pipe is in non-operation, the working fluid is accumulated on the condensing section side due to gravity. Hence, it is difficult to steadily supply the working fluid when the operation of the heat pipe is restarted so as to supply the working fluid in the wick to the evaporating section. Thus, it is considered to form a wick between the condensing section and the evaporating section through the liquid returning pipe. However, increasing the cross section of the wick will result in loss of capillary force; thereby supply efficiency of the working fluid to the evaporating section decreases.

The invention is provided in view of the foregoing, and it is an object of the invention to provide a heat pipe capable of efficiently cooling a heat generating component, independently of inclination angle of the loop heat pipe, and to provide an electronic device provided therewith.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments of a loop heat pipe and an electronic device having the loop heat pipe according to the invention will be described hereinafter with reference to the accompanying drawings. In general, according to one embodiment of the invention, a loop heat pipe including a fluid circulating channel containing fluid, includes: a heat generating component; an evaporating portion configured to vaporize the fluid by heat from the heat generating component; a condensing portion configured to liquefy the fluid vaporized by the evaporating portion; a first fluid channel connecting the evaporating portion and the condensing portion, the fluid vaporized by the evaporating portion flowing through the first fluid channel; a second fluid channel connecting the evaporating portion and the condensing portion, the fluid liquefied by the condensing portion flowing through the second fluid channel; a liquid accumulating portion formed on an inner wall of the second fluid channel, and provided between the evaporating portion and the condensing portion, the liquid accumulating portion being configured to accumulate the liquid liquefied by the condensing portion; and a wick provided between the evaporating portion and a position where the liquid accumulating portion is formed.

According to another embodiment of the invention, an electronic device, has: a heat generating component; a heat receiver thermally connected to the heat generating component; a heatsink configured to dissipate heat from the heat generating component received by the heat receiver; and a loop heat pipe thermally connecting the heat receiver and the heatsink, and has a fluid circulating channel containing fluid. The loop heat pipe includes: an evaporating portion configured to vaporize the fluid by heat from the heat generating component; a condensing portion configured to liquefy the fluid vaporized by the evaporating portion; a first fluid channel connecting the evaporating portion and the condensing portion, the fluid vaporized by the evaporating portion flowing through the first fluid channel; a second fluid channel connecting the evaporating portion and the condensing portion, the fluid liquefied by the condensing portion flowing through the second fluid channel; a liquid accumulating portion formed on an inner wall of the second fluid channel, and provided between the evaporating portion and the condensing portion, the liquid accumulating portion being configured to accumulate the liquid liquefied by the condensing portion; and a wick provided between the evaporating portion and a position where the liquid accumulating portion is formed.

In the following, an electronic device having the loop heat pipe according to the embodiments will be described as, for example, a notebook personal computer (hereinafter, referred to as a portable computer). However, the electronic device is not limited thereto, and may be any device that cools a heat generating component using the loop heat pipe. For example, the electronic device may be applied to other electronic device such as a portable information terminal and the like. Furthermore, the electronic device may be modified and implemented as long as such electronic device falls within the scope of the invention.

Figure 1:
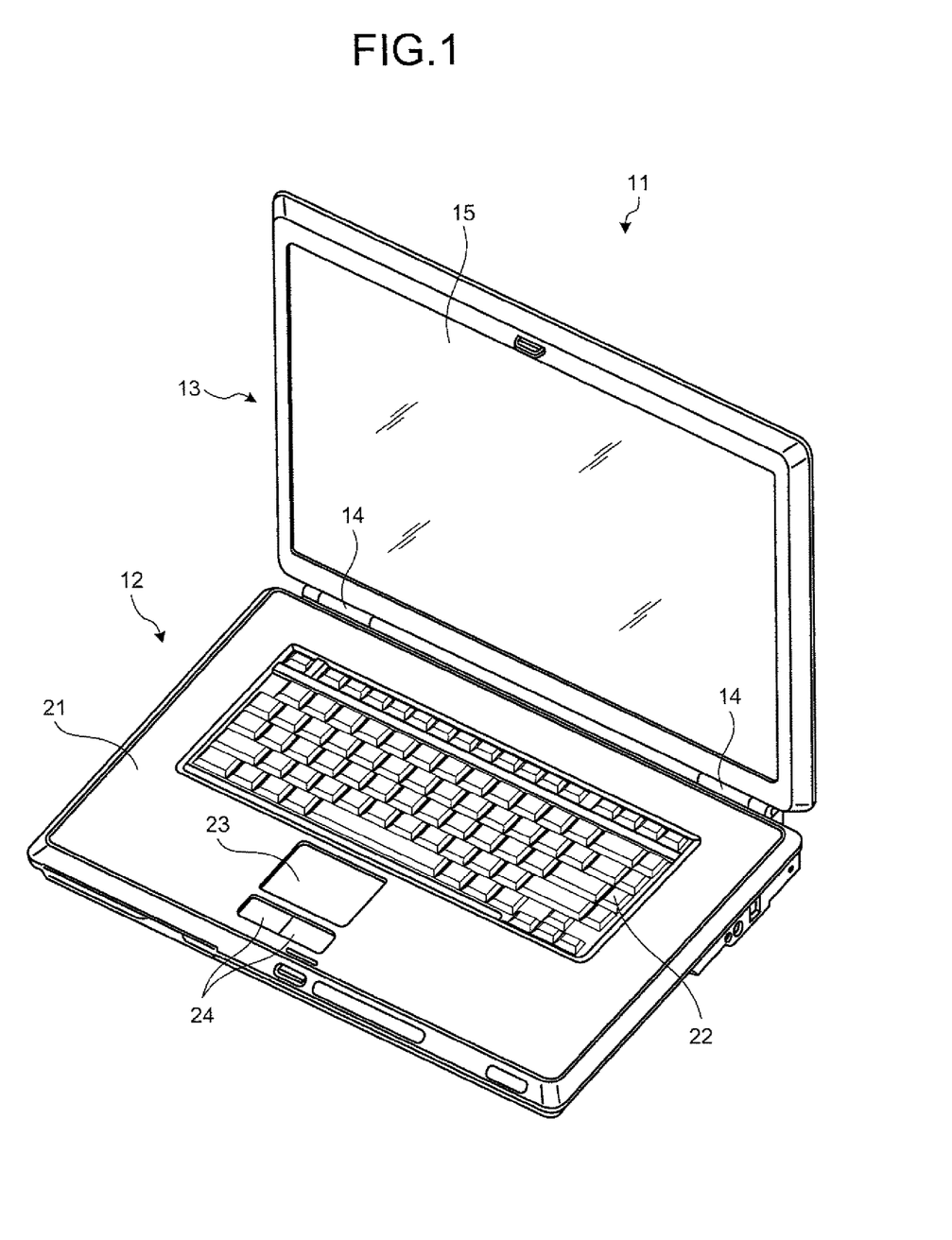
FIG. 1 is an exemplary perspective view of a portable computer according to a first embodiment of the invention.
Figure 2:
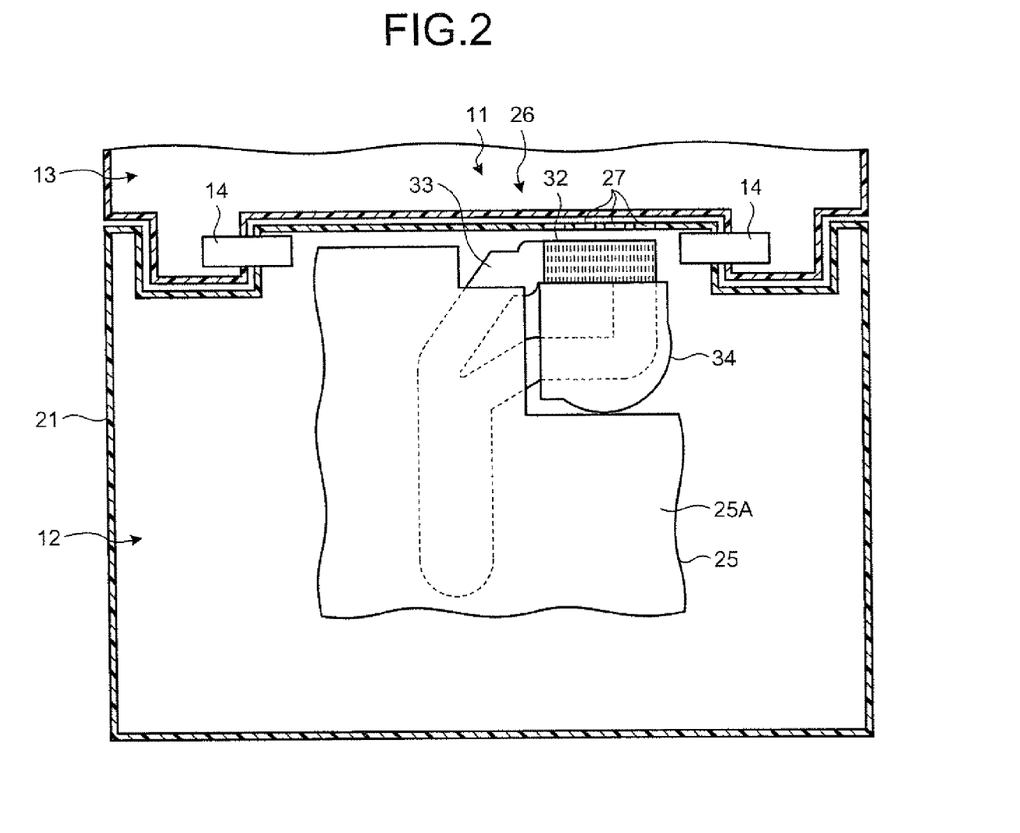
FIG. 2 is an exemplary cross sectional view of a container of the portable computer taken in a horizontal direction in the embodiment.
Figure 3:
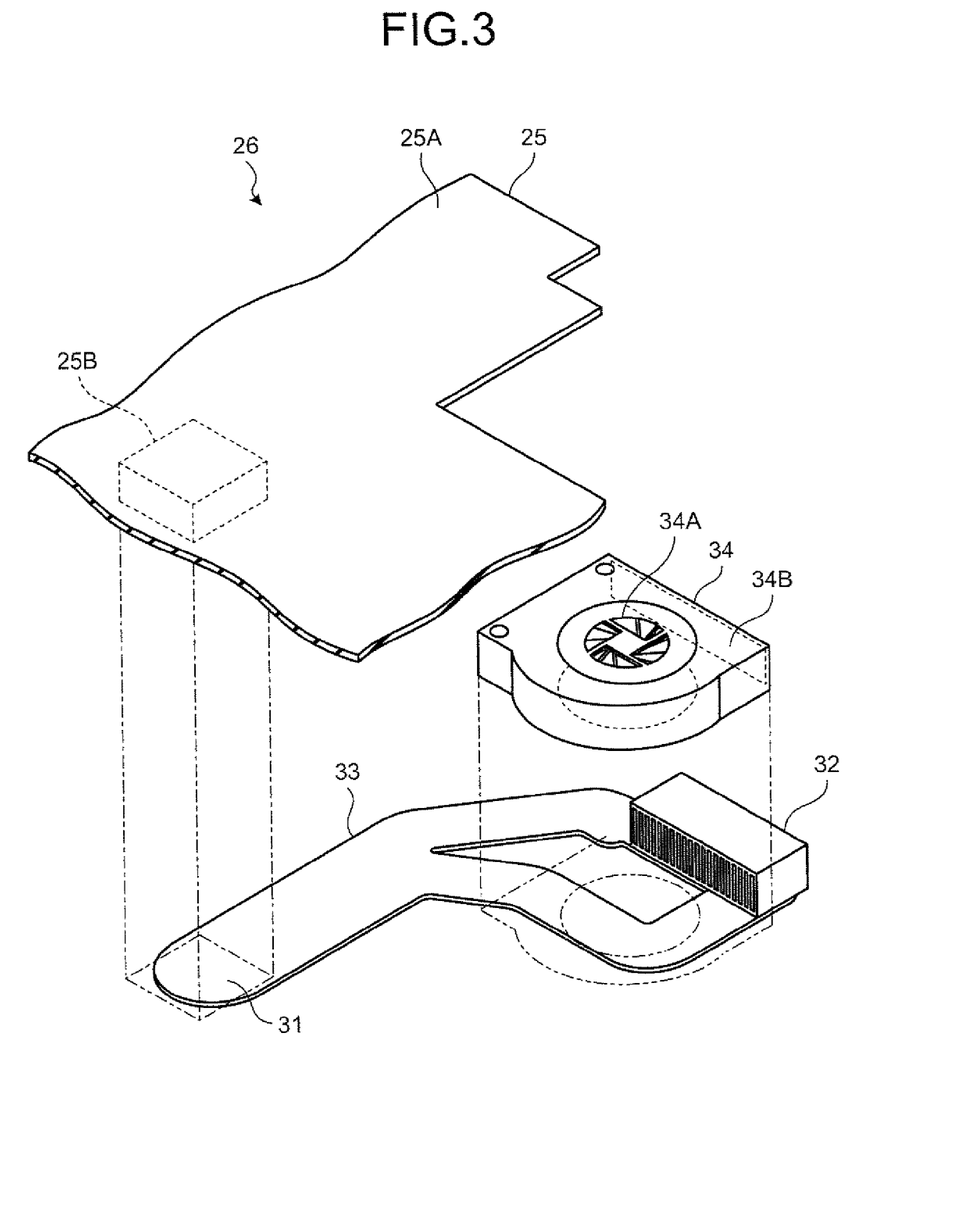
FIG. 3 is an exemplary exploded perspective view of a cooling apparatus housed in the container in the embodiment.
Figure 4:
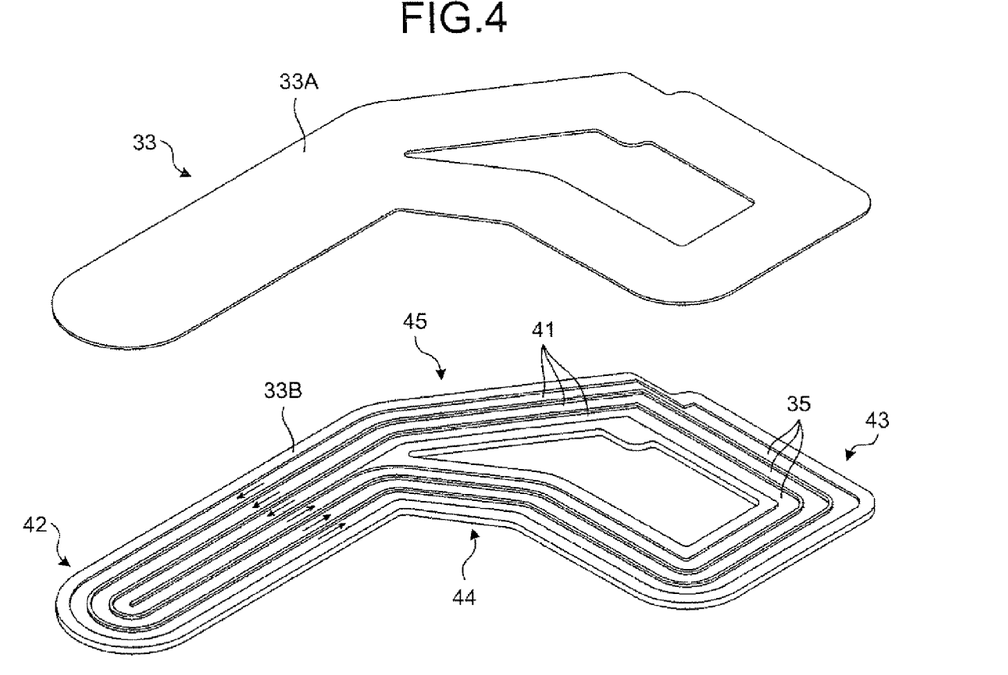
FIG. 4 is an exemplary exploded perspective view of a loop heat pipe of the cooling apparatus in the embodiment.

A configuration of a portable computer according to a first embodiment is explained with reference to FIGS. 1 to 4. FIG. 1 is a perspective view of a portable computer according to the first embodiment. FIG. 2 is a cross sectional view of a container of the portable computer taken along in a horizontal direction. FIG. 3 is a exploded perspective view of a cooling apparatus contained in the housing. FIG. 4 is a exploded perspective view of a loop heat pipe of the cooling apparatus.

As illustrated in FIG. 1, a portable computer 11 according to the first embodiment includes a main body module 12, a display module 13, a hinge mechanism 14 provided between the main body module 12 and the display module 13. The hinge mechanism rotatably supports the display module 13 with respect to the main body module 12.

The display module 13 includes a display 15 such as a cathode ray tube (CRT) or a liquid crystal display (LCD) displaying various information. The main body module 12 includes, as illustrated in FIGS. 1 and 2, a housing 21, a keyboard 22 attached to the housing 21, a touchpad 23, a button 24, a printed circuit board 25 housed in the housing 21, and a cooling apparatus 26 that cools a heat generating component 25B of the printed circuit board 25.

As illustrated in FIGS. 2 and 3, the printed circuit board 25 includes a printed circuit board 25A having a plurality of wiring layers of copper wires. The wiring layers are laminated on each other and the heat generating component 253 is mounted on the printed circuit board 25. The heat generating component 253 has, for example, a central processing unit (CPU). However, the heat generating component 25B is not limited thereto, and for example, the heat generating component 25B may be other circuit component such as a north bridge or a graphical chip. In the first embodiment, only one heat generating component 25B is explained as a circuit component that is to be cooled by the cooling apparatus 26; however, the first embodiment is not limited thereto, and the cooling apparatus 26 may cool a plurality of heat generating components.

The cooling apparatus 26 is housed in the housing 21, and cools the heat generating component 25B mounted on the printed circuit board 25. The cooling apparatus 26 includes a heat receiver 31, a heatsink 32, a loop heat pipe 33, and a fan module 34.

The heat receiver 31 is thermally connected to the heat generating component 25B, and configured as a portion of the loop heat pipe 33. However, the first embodiment is not limited thereto, and for example, a rectangular heat receiving plate having good thermal conductivity may be provided as the heat receiver.

The heatsink 32 dissipates heat received by the heat receiver 31 to outside. The heatsink 32 is, for example, formed by connecting a plurality of rectangular fins.

The fan module 34 accelerates the dissipation of heat at the heatsink 32. In the first embodiment, as illustrated in FIG. 3, the fan module 34 includes a fan main body 34A, a casing 34B surrounding the fan main body 34A, and a motor that rotates the fan main body 34A. The motor is electrically connected to the printed circuit board 25, and the printed circuit board 25 controls to rotate the fan main body 34A.

The loop heat pipe 33 thermally connects between the heat receiver 31 and the heatsink 32. In the first embodiment, as illustrated in FIG. 4, the loop heatpipe 33 is formed by placing on top of each other a first plate member 33A and a second plate member 33B. The first plate member 33A and the second plate member 33B are each formed of copper. However, the material forming the first plate member 33A and the second plate member 33B are not limited thereto, and the first plate member 33A and the second plate member 33B may be formed of aluminum alloy.

A groove 35 is formed on the second plate member 33B through etching or the like, and a circulatory fluid channel 41 containing working fluid is formed by the groove 35. In the first embodiment, three fluid channels 41 are formed at the second plate member 33B.

The working fluid changes its state between liquid and gas, and for example, the working fluid is formed by water. However, the working fluid is not limited thereto, and may be formed by ethanol, ammonia, butane, and/or the like that can change its state between liquid and gas.

Amount of heat transport of the loop heat pipe 33 is much larger than amount of heat transport of a conventional rod-type heat pipe, thus they absolutely differ from each other. More particularly, the amount of heat transport of the conventional rod-type heat pipe having 6 mm in outer diameter is, for example, substantially 35 Watt, and the amount of heat transport of the loop heat pipe having 4.2 mm in outer diameter is, for example, 1000 Watt.

Figure 5:
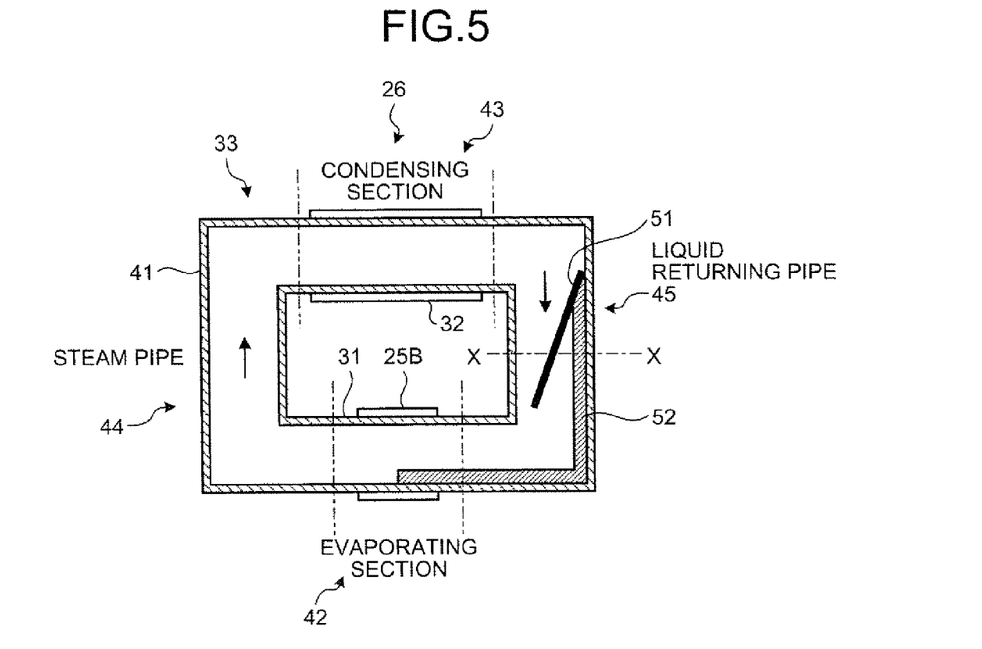
FIG. 5 is an exemplary longitudinal schematic cross sectional view of a fluid channel in the embodiment.
Figure 6:
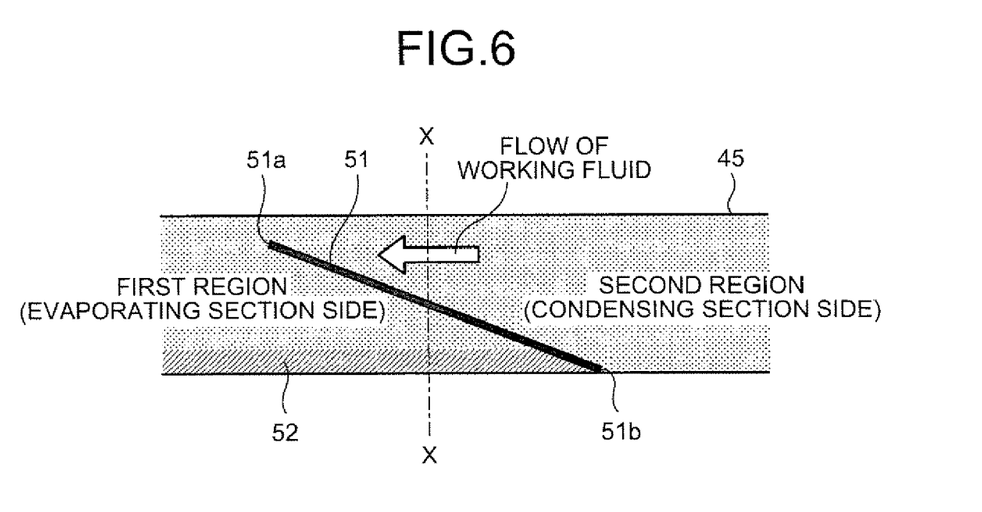
FIG. 6 is an exemplary longitudinal cross sectional view of a liquid returning pipe in the embodiment.
Figure 7:
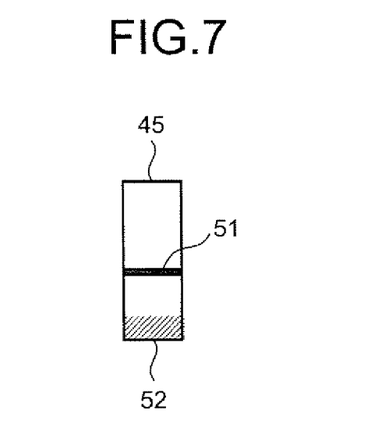
FIG. 7 is an exemplary latitudinal cross sectional view of the liquid returning pipe in the embodiment.

The fluid channel 41 is explained in detail with reference to FIGS. 4 to 7. FIG. 5 is a longitudinal cross sectional view schematically illustrating a configuration of the fluid channel. FIG. 6 is a longitudinal cross sectional view of a liquid returning pipe. FIG. 7 is a latitudinal cross sectional view of the liquid returning pipe. The fluid channel 41 includes an evaporating section 42, a condensing section 43, a steam pipe 44, a liquid returning pipe 45, a liquid accumulating section 51, and a wick 52.

The evaporating section is thermally connected to the heat generating component 255. The evaporating section 42 vaporizes the working fluid by heat of the heat generating component 25B to take away the heat of the heat generating component 25B.

The condensing section 43 is thermally connected to the heatsink 32. The condensing section 43 liquefies the working fluid vaporized by the evaporating section 42, and transports the heat transported from the heat generating component 255 to the heatsink 32.

The steam pipe 44 connects between the evaporating section 42 and the condensing section 43, and the working fluid vaporized by the evaporating section 42 flows therethrough.

The liquid returning pipe 45 is provided separately from the steam pipe 44, and connects between the evaporating section 42 and the condensing section 43. The working fluid liquefied by the condensing section 43 flows through the liquid returning pipe 45. In the first embodiment, the liquid returning pipe 45 and the steam pipe 44 are separately provided; however, the first embodiment is not limited thereto. That is to say, the liquid returning pipe 45 and the steam pipe 44 are not necessarily provided separately, as long as the liquefied working fluid is transported separately from the vaporized working fluid. More particularly, for example, a pipe that connects between the evaporating section 42 and the condensing section 43 may be provided, and the pipe is provided with a partition board therein, forming a region where the vaporized working fluid flows and a region where the liquefied working fluid flows.

The liquid accumulating section 51 is formed on an inner wall of the liquid returning pipe 45, and provided between the evaporating section 42 and the condensing section 43, so that the working fluid liquefied by the condensing section 43 can be accumulated thereat.

In the first embodiment, as illustrated in FIGS. 6 and 7, the liquid accumulating section 51 is a square partition board dividing inside the liquid returning pipe 45 into a first region towards the evaporating section 42 side and a second region towards a condensing section 43 side. The liquid accumulating section 51 is formed so that a first edge portion 51b is fixed on the inner wall of the liquid returning pipe 45, and a second edge portion 51a that is not fixed to the inner wall of the liquid returning pipe 45 is extended obliquely towards the first region side. As a result, the second edge portion 51a of the partition board and the inner wall of the liquid returning pipe 45 form an opening portion, and the working fluid flows from the second region to the first region through the opening portion. Further, a liquid pool formed between the partition wall and the inner wall of the liquid returning pipe 45 can accumulate the working fluid liquefied by the condensing section 43 when the loop heat pipe is operated in the top heat mode. Here, the loop heat pipe operated in the top heat mode has the evaporating section positioned higher than the condensing section 43, so that the circulation of the working fluid stops.

In the first embodiment, the liquid accumulating section 51 is configured by the square partition board; however, the first embodiment is not limited thereto. That is to say, such liquid accumulating section may be provided as long as, in the top heat mode, a wall portion capable of accumulating the working fluid liquefied by the condensing section 43 is formed on the inner wall of the liquid returning pipe 45. For example, a curved wail portion dividing inside the liquid returning pipe 45 into the first region positioned on the evaporating section 42 side and the second region positioned on the condensing section 43 side may be formed on the inner wall of the liquid returning pipe 45.

Further, in the first embodiment, one liquid accumulating section 51 is formed inside the liquid returning pipe 45; however, a plurality of liquid accumulating sections 51 may be formed inside the liquid returning pipe 45. For example, a second liquid accumulating section may be formed on an inner wall that is opposite to the inner wall where the first liquid accumulating section 51 is formed, and at a position shifting from where the liquid accumulating section 51 is formed in the direction towards the evaporating section 42 or the condensing section 43.

The wick 52 is provided along the inner wall on which the first edge portion 51b is fixed, and provided between the evaporating section 42 and the position where the first edge portion 51b is fixed. Accordingly, capillary force of the wick 52 is acted on the liquefied working fluid, and the working fluid refluxes to the evaporating section 42. In the first embodiment, the wick 52 is formed of a porous material that is formed by sintering metallic powder inside the fluid channel 41. Further, in the first embodiment, the wick 52 is continuously formed between the evaporating section 42 and a position where the first edge portion 51b fixed, along the inner wall surface where the first edge portion 51b is fixed.

However, the wick 52 is not limited thereto, and may be provided anywhere, as long as the wick 52 is provided between the evaporating section 42 and a position where the liquid accumulating section 51 is formed so that the working fluid accumulated in the liquid accumulating section 51 becomes capable of refluxed to the evaporating section 42 by the capillary force of the wick 52.

In the cooling apparatus 26 of the first embodiment, the heat from the heat generating component 25B is transported to the evaporating section 42 of the loop heat pipe 33 through the heat receiver 31. The evaporating section 42 vaporizes the working fluid that has absorbed the heat, and transports the heat to the condensing section 43. The condensing section 43 then liquefies the vaporized working fluid by releasing the heat. As a result, the heat of the heat generating component 25B is transported to the heatsink 32. The heat transported to the heatsink 32 is given away to the air supplied from the fan module 34, and the heat given away to the air is released to the atmosphere through an opening portion 27 of the housing 21.

Figure 8:
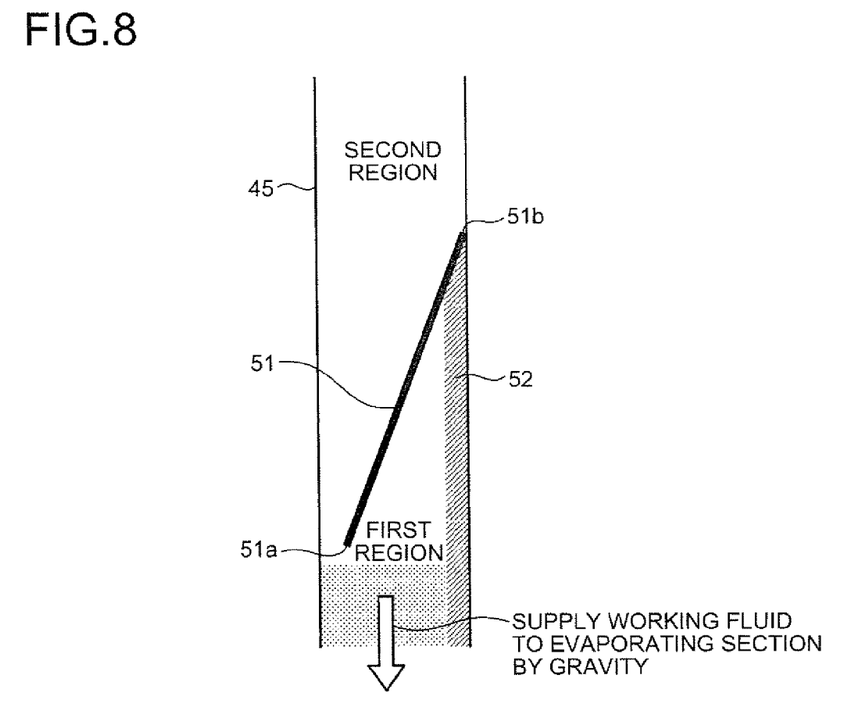
FIG. 8 is an exemplary diagram illustrating working fluid that is being supplied to an evaporating section of the loop heat pipe in the non top heat mode in the embodiment.
Figure 9:
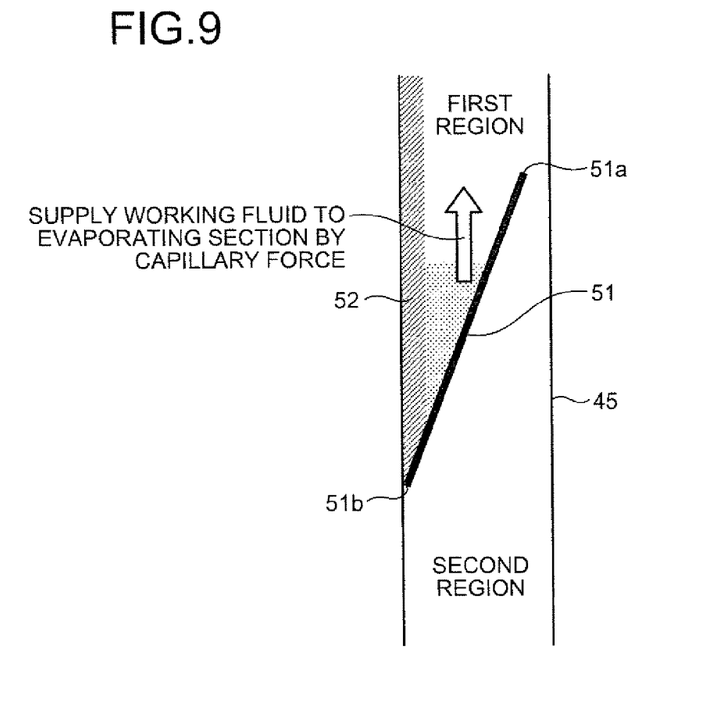
FIG. 9 is an exemplary diagram illustrating working fluid that is being supplied to the evaporating section of the loop heat pipe in the top heat mode in the embodiment.

Supplying of the working fluid to the evaporating section 42 of the loop heat pipe 33 operated in the top heat mode and in the non top heat mode is explained with reference to FIGS. 8 and 9. FIG. 8 is a diagram of the working fluid that is being supplied to the evaporating section of the loop heat pipe 33 in the non top heat mode. FIG. 9 is a diagram of the working fluid that is being supplied to the evaporating section of the loop heat pipe 33 in the top heat mode.

In the non top heat mode where the evaporating section 42 is at a position lower than the condensing section 43, the working fluid liquefied by the condensing section 43 flows from the second region to the first region by gravity, through the opening portion formed between the second edge portion 51a and the inner wall of the liquid returning pipe 45. Hence, in the non top heat mode, the working fluid can steadily be supplied to the evaporating section 42 by gravity.

On the other hand, as described above, in the top heat mode where the evaporating section 42 is at a position higher than the condensing section 43, the working fluid liquefied by the condensing section 43 is more easily accumulated in the condensing section 43 by gravity. Accordingly, it becomes difficult to supply the working fluid to the evaporating section 42. However, in the first embodiment, as illustrated in FIG. 9, in the top heat mode, the liquefied working fluid can be accumulated in the liquid accumulating section 51, and the working fluid accumulated by the liquid accumulating section 51 can be supplied to the evaporating section 42 by the capillary force of the wick 52. In particular, when the loop heat pipe 33 in the top heat mode stops its operation and while in its non-operation, the working fluid is accumulated on the condensing section 43 side by gravity. Then, when the loop heat pipe 33 restart its operation, the working fluid held by the wick 52 is supplied to the evaporating section 42, and the working fluid accumulated in the liquid accumulating section 51 can subsequently be supplied to the evaporating section 42.

As described above, the portable computer 11 of the first embodiment can supply the working fluid steadily to the evaporating section 42 even when the loop heat pipe 33 is operated in the top heat mode. Accordingly, the heat generating component 25B can be cooled efficiently, independently of the inclination angle of the loop heat pipe 33. In particular, a portable device such as the portable computer 11 is placed in various ways depending on its usage or storing condition, so that the loop heat pipe 33 may be operated in the top heat mode. However, in the portable computer 11 of the first embodiment, the working fluid can steadily be supplied to the evaporating section 42.

Furthermore, in the portable computer 11 of the first embodiment, the wick 52 is not necessarily be continuously formed between the condensing section 43 and the evaporating section 42 through the liquid returning pipe 45 so as to supply the working fluid liquefied by the condensing section 43 to the evaporating section 42 in the top heat mode. Accordingly, the liquid returning pipe 45 can be formed at low cost, and also loss in capillary force due to increasing cross section of the wick 52 can be suppressed to improve supply efficiency of the working fluid to the evaporating section 42 by the wick 52.

The portable computer 11 according to a second embodiment is provided with a looplike liquid accumulating section in the liquid returning pipe 45 and extended in the direction the liquid returning pipe 45 extends. Explanations of configurations identical to that of the first embodiment are omitted, and configurations different from that of the first embodiment are only explained.

Figure 10:
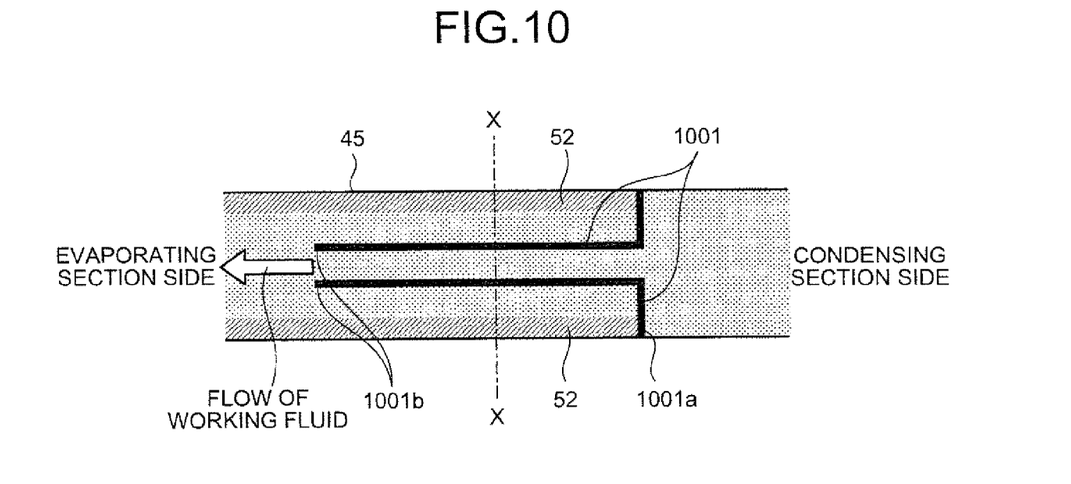
FIG. 10 is an exemplary longitudinal cross sectional view of a liquid returning pipe according to a second embodiment of the invention.
Figure 11:
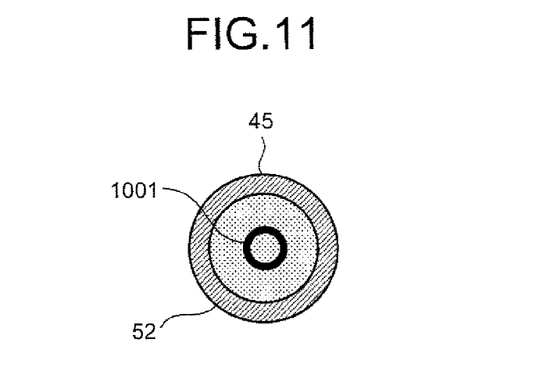
FIG. 11 is an exemplary latitudinal cross sectional view of the liquid returning pipe in the embodiment.

The liquid returning pipe 45 of the second embodiment is explained in detail with reference to FIGS. 10 and 11. FIG. 10 is a longitudinal cross sectional view of the liquid returning pipe. FIG. 11 is a latitudinal cross sectional view of the liquid returning pipe.

A liquid accumulating section 1001 is provided along a direction towards which the liquid returning pipe 45 extends, and provided in the liquid returning pipe 45 in circular loop shape. The liquid accumulating section 1001 is formed so that a first edge portion 1001a provided on a condensing section 43 side is fixed to an inner wall of the liquid returning pipe 45. An opening portion is formed between the inner wall of the liquid returning pipe 45 and a second edge portion 1001b (an edge portion located on the evaporating section 42 side) that is not fixed to the inner wall of the liquid returning pipe 45. The first edge portion 1001a and the inner wall of the liquid returning pipe 45 form the opening portion, and the working fluid can flow from the condensing section 43 side to the evaporating section 42 side through the opening portion. In the top heat mode, the working fluid liquefied by the condensing section 43 can be accumulated at a liquid pool formed between the liquid accumulating section 1001 and the liquid returning pipe 45, and hence, the accumulated working fluid can be supplied to the evaporating section 42 by the capillary force of the wick 52.

In the second embodiment, the liquid accumulating section 1001 is provided inside the liquid returning pipe 45. However, the second embodiment is not limited thereto, as long as a loop-shaped section is provided inside the liquid returning pipe 45. For example, the liquid accumulating section 1001 with a rectangular loop shape having a rectangular cross section may be provided.

Figure 12:
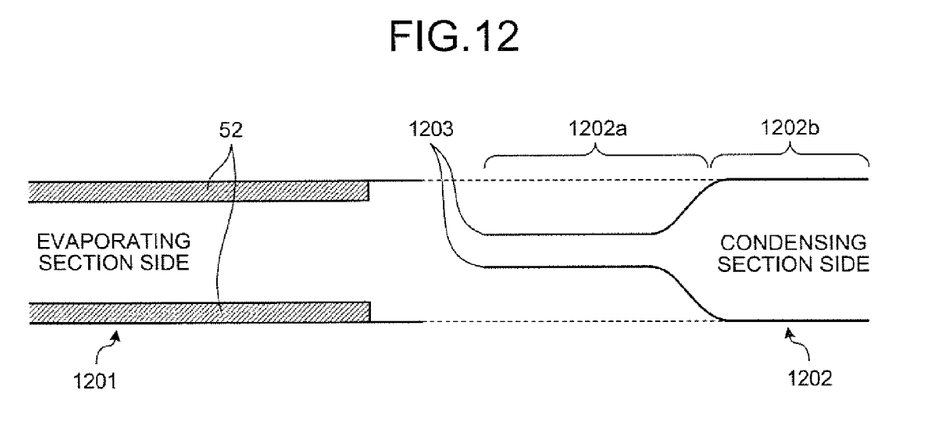
FIG. 12 is an exemplary diagram illustrating formation of the liquid returning tube and the liquid accumulating section.

An example of formation of the liquid returning pipe 45 and the liquid accumulating section 1001 according to the second embodiment is explained. FIG. 12 is a diagram of formation of the liquid returning pipe and the liquid accumulating section.

In the formation of the liquid returning pipe and the liquid accumulating section illustrated in FIG. 12, a circular loop like first pipe 1201 and a circular loop like second pipe 1202 are first prepared. Here, the wick 52 is formed on the inner wall surface of the first pipe 1201. Further, the second pipe 1202 includes a first portion 1202a having an outer diameter smaller than an inner diameter of the first pipe 1201, and a portion 1202b having an outer shape substantially similar to an inner diameter of the first pipe 1201. Then, the portion 1202a of the second pipe 1202 is inserted into the first pipe 1201, and an inner wall surface of the first pipe 1201 and an outer wall surface of the portion 1202b are compressed with each other to be bonded with each other. Accordingly, an opening is formed by the edge portion 1203 of the second pipe 1202 on the condensing section 43 side and the inner wall of the first pipe 1201, so that the working fluid can flow into the evaporating section 42 from the condensing section 43 side through the opening. Furthermore, in the top heat mode, the working fluid liquefied by the condensing section 43 can be accumulated in the liquid pool formed between the portion 1202a and the inner wall of the first pipe 1201, so that the accumulated working fluid can be supplied to the evaporating section 42 by the capillary force of the wick 52.

As described above, according to the portable computer 11 of the second embodiment, the working fluid can also steadily be supplied to the evaporating section 42 even in the top heat mode.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A loop heat pipe containing fluid, comprising:
an evaporating portion where the fluid is vaporized by heat;
a condensing portion where the fluid vaporized at the evaporating portion is liquefied;
a first fluid channel portion provided over the evaporating portion and the condensing portion, and through which the fluid vaporized at the evaporating portion flows to the condensing portion;
a second fluid channel portion provided over the evaporating portion and the condensing portion, and through which the fluid liquefied at the condensing portion flows to the evaporating portion;
a wall portion to which a storage portion is provided, the storage portion protruding from an inner wall of the second fluid channel portion towards an evaporating portion side and being opened to the evaporating portion side in the second fluid channel portion so as to be capable of storing the fluid flowed from the evaporating portion side to a condensing portion side; and
a wick provided between the evaporating portion and the storage portion provided to the wall portion.

2. The loop heat pipe of claim 1, wherein the evaporating portion to vaporize the fluid by heat from a heat generating component.

3. The loop heat pipe of claim 1, wherein the wall portion protrudes obliquely towards the evaporating portion side from the inner wall of the second fluid channel portion.

4. The loop heat pipe of claim 1, wherein the wall portion is provided in a loop in the second fluid channel portion.

5. An electronic device, comprising:
a heat receiver
a heatsink configured to dissipate heat from the heat receiver; and
a loop heat pipe containing fluid and includes an evaporating portion where the fluid is vaporized;

a condensing portion where the fluid vaporized at the evaporating portion is liquefied;

a first fluid channel portion provided over the evaporating portion and the condensing portion, and through which the fluid vaporized at the evaporating portion flows to the condensing portion;

a second fluid channel portion provided over the evaporating portion and the condensing portion, and through which the fluid liquefied at the condensing portion flows to the evaporation portion;

a wall portion to which a storage portion is provided, the storage portion protruding from an inner wall of the second fluid channel portion towards an evaporating portion side and being opened to the evaporating portion side in the second fluid channel portion for storing the fluid flowed from the evaporating portion side to a condensing portion side; and a wick provided between the evaporating portion and the storage portion provided to the wall portion.

6. The loop heat pipe of claim 5, wherein the heat receiver is thermally coupled to a heat generating component that generates heat used by the evaporation portion of the loop heat pipe to vaporize the fluid.

7. The loop heat pipe of claim 5, wherein the wall portion protrudes obliquely towards the evaporating portion side from the inner wall of the second fluid channel portion.

8. The loop heat pipe of claim 5, wherein the wall portion is provided in a loop in the second fluid channel portion.

9. An electronic device, comprising:

a heat generating component; and a heat pipe comprising:

a heat receiving portion containing fluid, and configured to receive heat from the heat generating component;

a heat dissipating portion configured to dissipate the heat from the heat receiver;

a first fluid channel portion provided over the heat receiving portion and the heat dissipating portion;

a second fluid channel portion provided over the heat receiving portion and the heat dissipating portion at a position different from where the first fluid channel is provided;

a wall portion protruding towards the receiving portion from an inner wall of the second fluid channel portion; and a wick provided between the wall portion and the heat dissipating portion.

* * * * *